J. C. WOLFE & E. W. MORTON.
ADDING ATTACHMENT FOR TYPE WRITERS.
APPLICATION FILED OCT. 24, 1899.

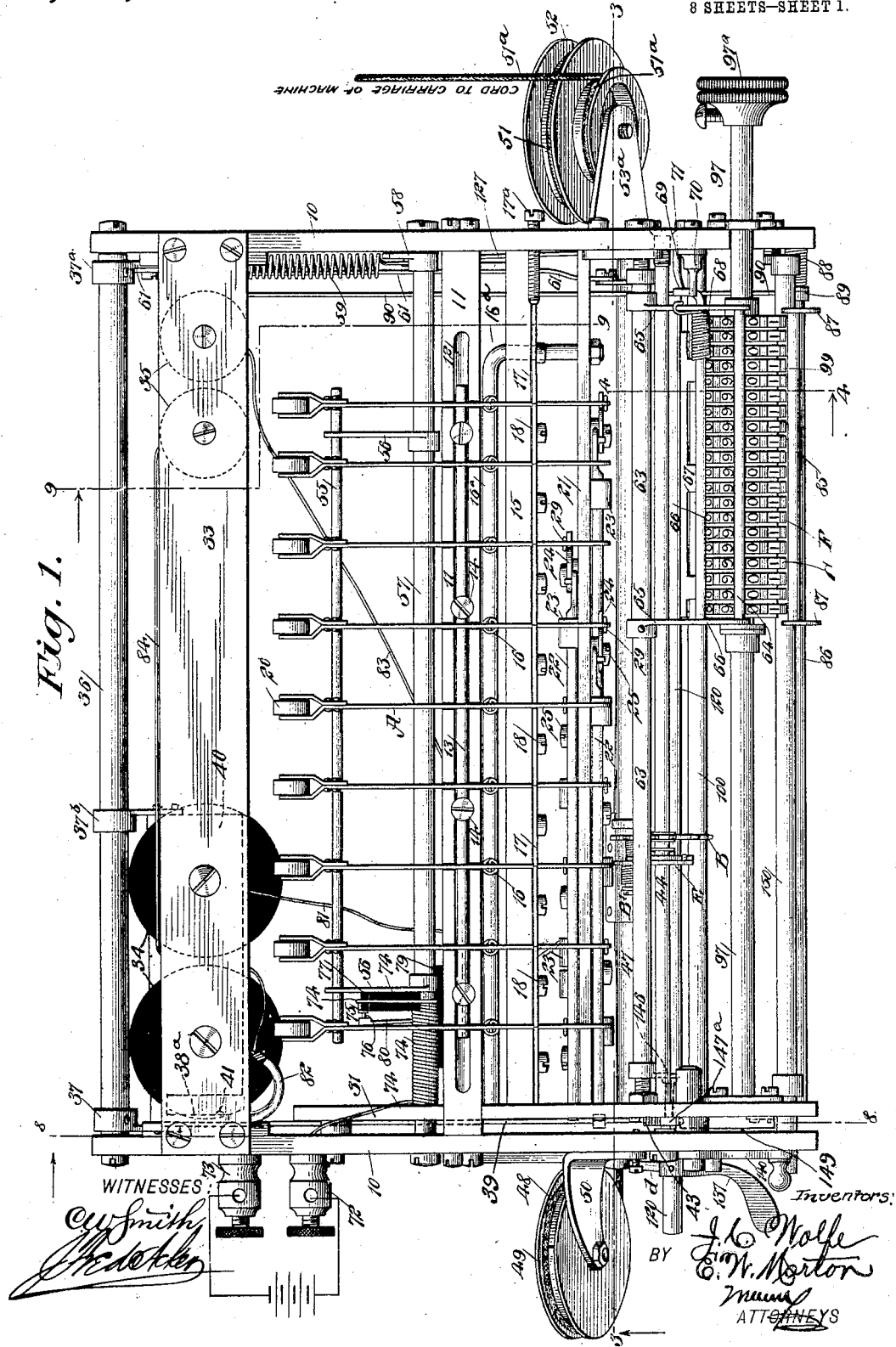

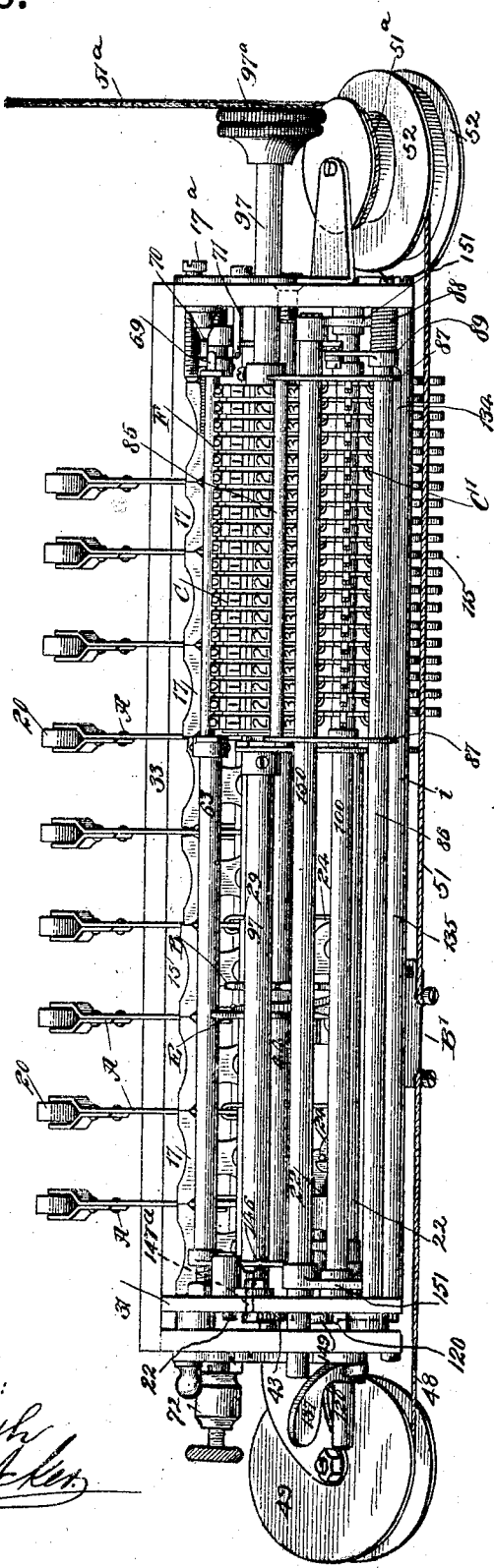

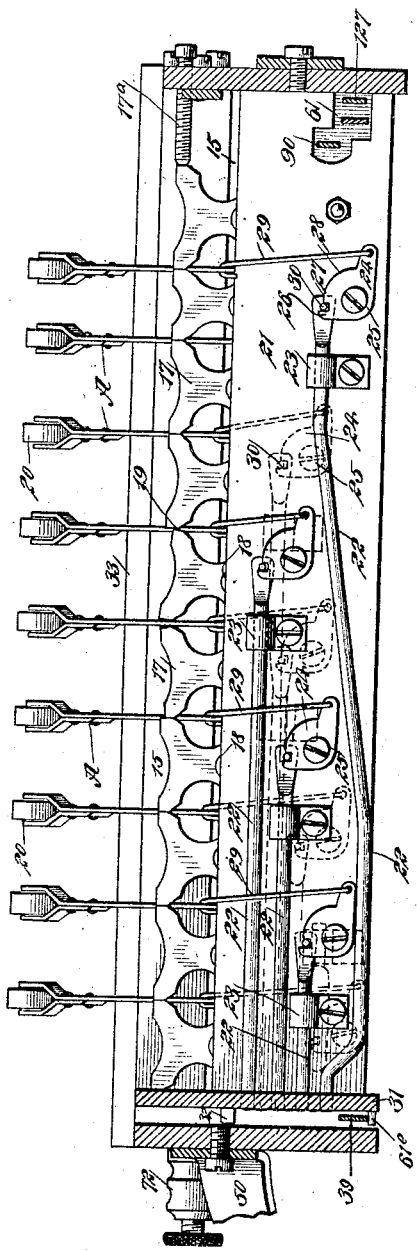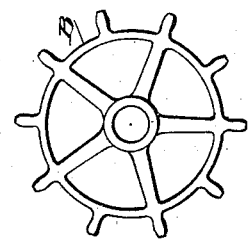

1,062,870.

Patented May 27, 1913.

8 SHEETS—SHEET 4.

J. C. WOLFE & E. W. MORTON.
ADDING ATTACHMENT FOR TYPE WRITERS.
APPLICATION FILED OCT. 24, 1899.
1,062,870.
Patented May 27, 1913.
8 SHEETS—SHEET 5.
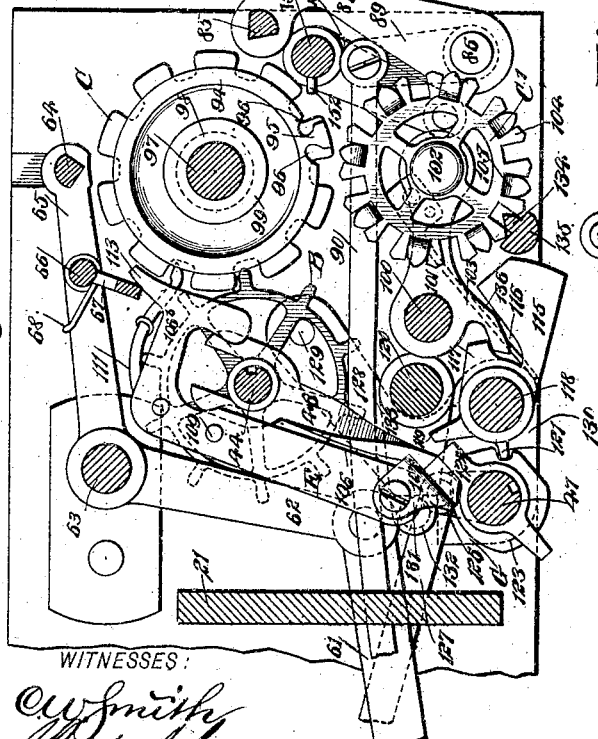

J. C. WOLFE & E. W. MORTON.
ADDING ATTACHMENT FOR TYPE WRITERS.
APPLICATION FILED OCT. 24, 1899.
1,062,870.
Patented May 27, 1913.
8 SHEETS—SHEET 6.
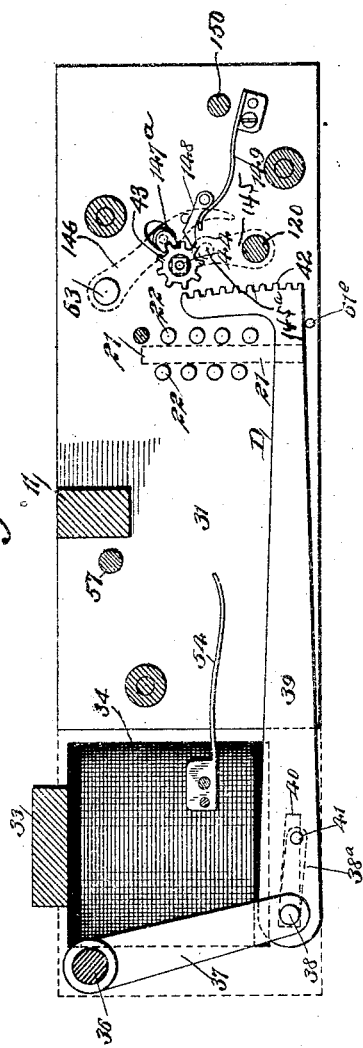
WITNESSES:
INVENTORS
J. C. Wolfe
BY E. W. Morton
ATTORNEYS J. C. WOLFE & E. W. MORTON.
ADDING ATTACHMENT FOR TYPE WRITERS.
APPLICATION FILED OCT. 24, 1899.
1,062,870.
Patented May 27, 1913.
8 SHEETS—SHEET 7.
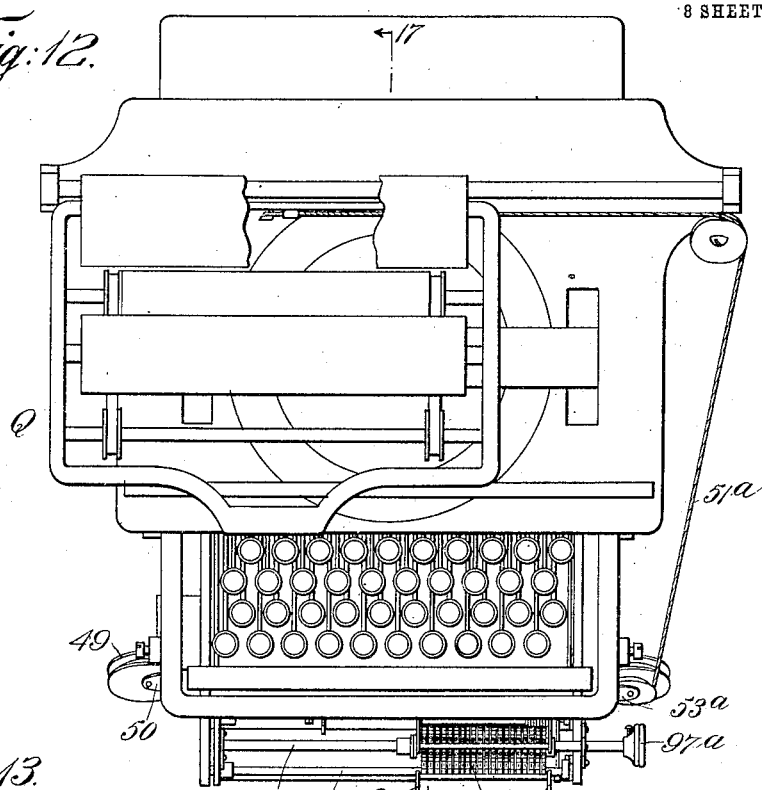
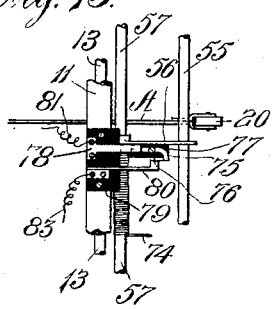
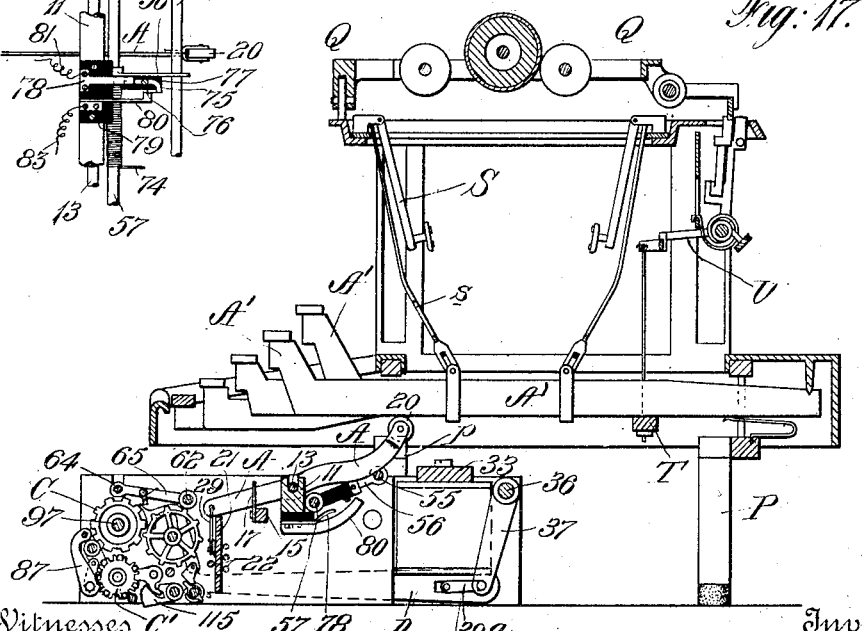

J. C. WOLFE & E. W. MORTON.
ADDING ATTACHMENT FOR TYPE WRITERS.
APPLICATION FILED OCT. 24, 1899.

1,062,870.

Patented May 27, 1913.
8 SHEETS—SHEET 8.

Witnesses
Jos. A. Ryan

Inventors
Jacob C. Wolfe
Edwin W. Morton.
By Munn & Co.
Attorneys

UNITED STATES PATENT OFFICE.

JACOB C. WOLFE, OF NEW YORK, AND EDWIN W. MORTON, OF WHITE PLAINS, NEW YORK, ASSIGNORS, BY DIRECT AND MESNE ASSIGNMENTS, TO AUTOMATA COMPANY, OF NEW YORK, N. Y., A CORPORATION OF NEW YORK.

ADDING ATTACHMENT FOR TYPE-WRITERS.

1,062,870.  Specification of Letters Patent.  Patented May 27, 1913.

Application filed October 24, 1899. Serial No. 734,618.

*To all whom it may concern:*

Be it known that we, JACOB C. WOLFE, of the city of New York, borough of Manhattan, in the county and State of New York, and EDWIN W. MORTON, of White Plains, in the county of Westchester and State of New York, have invented a new and Improved Adding Attachment for Type-Writers, of which the following is a full, clear, and exact description.

The object of the invention is to provide an improved adding attachment for type-writing or similar machines, so constructed that as figures are printed in columns by said machine the sum of figures in any number of columns may be read upon a group of index wheels constituting a portion of the attachment.

The invention consists in the novel construction and combination of the several parts, as will be hereinafter fully set forth and pointed out in the claims.

Reference is to be had to the accompanying drawings forming a part of this specification, in which similar characters of reference indicate corresponding parts in all the figures.

Figure 11:
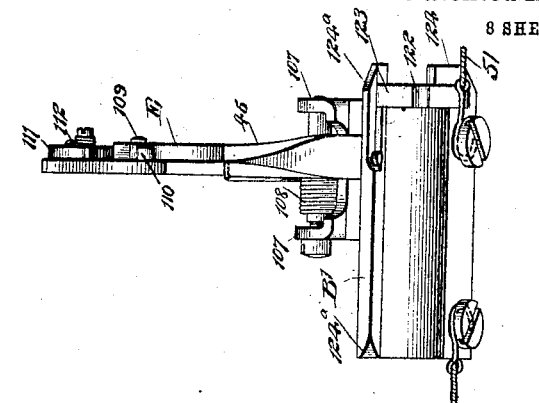
Figure 10:
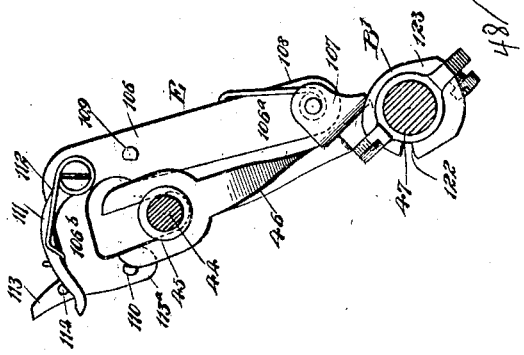
Figure 4:
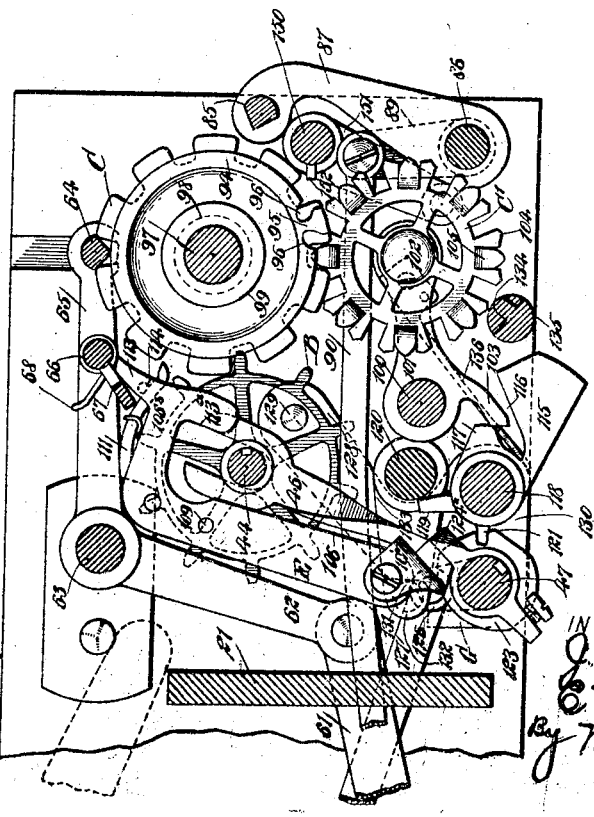
Figure 15:
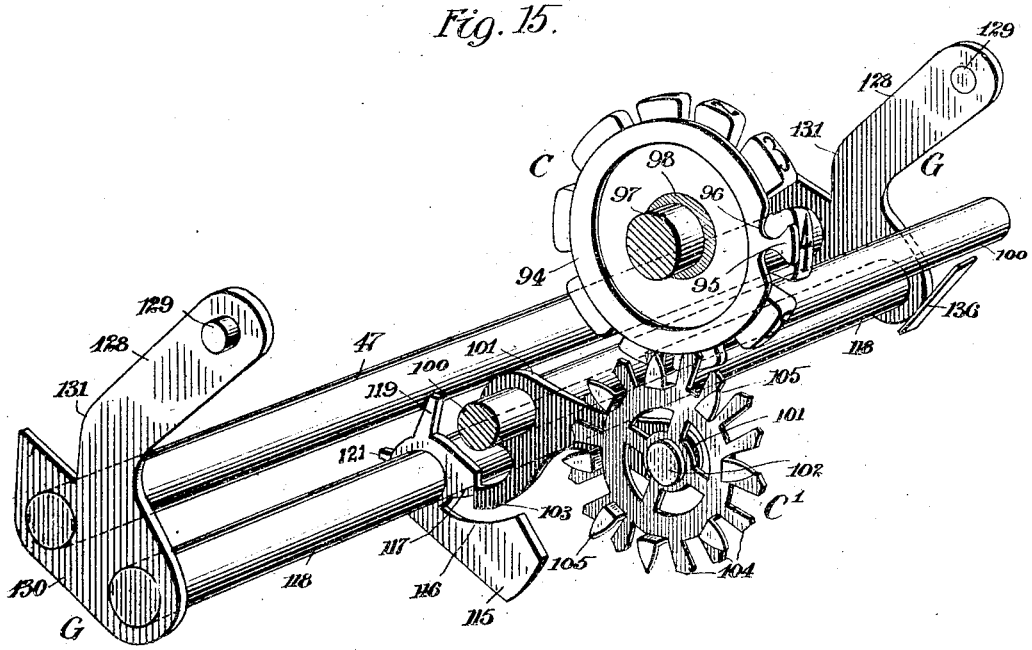
Figure 16:
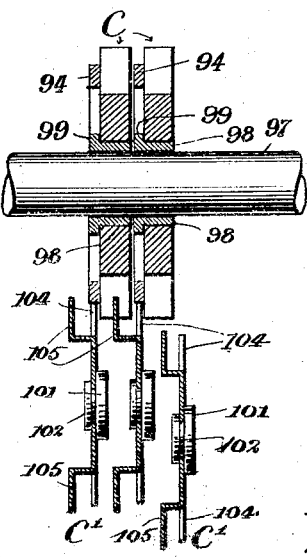

Figure 1 is a plan view of the attachment; Fig. 2 is a front elevation of the same; Fig. 3 is a longitudinal section taken substantially on the line 3—3 of Fig. 1; Fig. 4 is a transverse vertical section taken on the line 4—4 of Fig. 1, the drive wheel, index or adding wheels, carrying wheels, alining bars and check mechanism being in their normal positions; Fig. 5 is a section taken on the same line as in Fig. 4, showing the position occupied by the parts in said Fig. 4 just prior to the time the electrical contact is made that causes the drive wheel to be actuated; Fig. 6 is a section taken on the same line as in Figs. 4 and 5, illustrating the position occupied by the parts shown in the said figures, when the index or adding wheels are to be re-set; Fig. 7 is a view of the left-hand side of the machine; Fig. 8 is a section taken substantially on the line 8—8 of Fig. 1; Fig. 9 is a section taken substantially on the line 9—9 of Fig. 1; Fig. 10 is a side elevation of the check mechanism, the carriage for said mechanism and the carriage shaft and drive shaft being in transverse section; Fig. 11 is a side elevation of the carriage shown in Fig. 10, and an edge view of the check mechanism; Fig. 12 is a plan view of a typewriting machine of well-known form with our improvements applied; Fig. 13 is a bottom plan view of a portion of the support for the key levers and the universal bar shaft, illustrating the position of the contact points carried thereby; Fig. 14 is a detail view of the drive wheel. Fig. 15 is a perspective view of the swinging frame G together with one of the index wheels and a carrying wheel which carries the tens therefrom, as will be hereinafter fully set forth. Fig. 16 is a vertical sectional view taken through two adjacent index wheels with which coöperate three tens carrying wheels one of which is shown as dropped out of engagement with the index wheel to which it carries the tens. Fig. 17 shows a vertical section of the typewriting machine shown in Fig. 12 on the line 17—17 of Fig. 12, and illustrates particularly the relation of the adding mechanism to the printing mechanism.

The typewriting machine to which our improvements may be applied may be of any approved construction. We have shown it applied to a machine of the Remington type and have indicated in the drawings only so much of a machine of this class as is necessary to show the manner of using our invention on such machines.

As indicated in Fig. 17 the typewriting machine is supported by standards, P, and held sufficiently elevated to accommodate the adding mechanism. The carriage, Q, of the writing machine slides back and forth on suitable guides as usual and the keys, A', are arranged in the usual way. The type bars, S, are connected with the keys, A', by rods, s, and the universal bar, T, is connected with suitable spacing mechanism, U. The letters and figures are printed on the paper as usual by the manual operation of the keys, A', but the several figure keys are connected with the adding mechanism in the manner now to be described, the arrangement being such that whenever a figure is printed the adding mechanism is operated to record the value of the figure.

The frame of the adding or calculating machine consists usually of two side bars 10, connected at or near their centers by a longitudinal bar 11, in the top of which bar a longitudinal groove 12 is made, arranged to receive a rod 13, held in position by set screws 14 or their equivalents, and the said rod 13 is utilized to pivot the key levers A, which are nine in number. The right-hand lever is adapted to be brought beneath the letter 1, which usually represents the numeral 1 on a typewriting machine, and the other levers are brought respectively under the numeral keys, reading from 2 to 9 inclusive. Each key lever A is carried across a fixed bar 15 which is in front of the cross bar 11. This fixed bar 15, is shown in Figs. 1 and 3, and between the fulcrum bar 11 for the key levers and the front bar 15, a support 16ª is provided, usually in the nature of a bar, and on this support springs 16 are located, which serve to assist the key levers in assuming a normal position after they have been depressed.

The front fixed bar 15 is provided with a series of checks 17, adapted to prevent two key levers from being depressed at the same time. These checks 17 are in the nature of plates, and are best shown in Fig. 3. The said plates are substantially T-shaped in general contour, the ends of their heads 19 being adapted for engagement with each other, but there is sufficient space between the various checks to admit of the passage of a single key lever when the checks have been properly adjusted, and such adjustment is accomplished through the medium of a screw 17ª placed preferably at one end of the frame, as is also shown in Fig. 3. The key levers extend normally through the space between the shanks of the checks, and when one key lever is depressed at its rear end it will find a passage upward between the checks near which it is located, but the remainder of the checks will be crowded together to such an extent that none of the other key levers can be raised. These checks are pivoted by means of pins 18 or their equivalents passed through the lower end portions of their shanks and into the aforesaid fixed bar 15. Each key lever at its rear end is provided with a friction roller 20, and these friction rollers are adapted to be engaged by the keys of the type-writing machine with which they are to be associated. The levers A do not pass entirely beyond the space between the checks, and are therefore never entirely beyond the control of the checks.

A forward partition 21 extends from side to side of the frame, as is shown in Figs. 1, 2 and 3, and this partition 21 carries a series of bolts 22, mounted to slide in suitable bearings 23. Some of these bolts are arranged at the front of the partition 21 and others at the rear, and each bolt is connected with a key lever with the exception of the key lever adapted to be depressed by the numeral key 9 of the type writing machine. These bolts are so arranged that the bolt connected with the numeral key lever 1 is the lowermost bolt, while the other bolts are arranged one above the other in proper order. The bolt corresponding to the key lever to be depressed by the numeral key 9 is the uppermost bolt, and this bolt is stationary and is distinguished from the others by the reference numeral 32 and is best shown in Fig. 3. Each key lever is connected with a lever 24, and these levers are fulcrumed by means of suitable pins 25, some at the front side of the front partition 21 and others at the rear side of the said partition, as shown in Figs. 1 and 3. The levers 24 are in the form of angle or elbow levers, but each lever 24 is provided at its left-hand end with a spur 26, and a recess 27 next the said spur, the recesses 27 of the said levers being produced in their upper edges, and each lever 24 is further provided with a curved or segmental section 28, extending from the right-hand of a recess 27, which is lower than the left-hand wall, to a point near the right-hand end of the lever, as is best shown in Fig. 3, and the lower or right-hand end of each lever 24 is connected by a link 29, or its equivalent, with the forward end of a key lever A. Each movable bolt 22 is provided at its right-hand or inner end preferably with a flattened surface and with a pin 30, which projects from the said flattened surface and is adapted to enter and normally remain in a recess 27 of one of the bolt actuating levers 24 controlled by the key levers. Each time a key lever is depressed, the bolt actuating lever 24 connected therewith is operated in a manner to throw the bolt in communication therewith toward the left-hand side of the frame, and through an opening provided for the outer end of the bolt in a short transverse partition 31 adjacent to the right-hand side of the frame, as is indicated in Fig. 3; but the uppermost or stationary bolt 32 extends at all times beyond this inner transverse partition 31 and into the space between said partition and the said right-hand side of the frame, as is clearly shown in Fig. 3. The curved surfaces 28 of the bolt levers 24 serve to hold the bolts in their thrown position, as when the bolts are thrown the pins 30 leave the recesses 27 and ride upon the surfaces 28. The bolts 22 and 32 are adapted to limit the movement of the electrically operated segment or actuator D to be hereinafter described, which segment controls the movement of a drive wheel B, which drive wheel is adapted to act upon any one of a series of index wheels C, also to be hereinafter particularly mentioned.

A bar 33 extends from one side of the frame to the other at the rear, and this bar 33 constitutes the yoke of a main set of magnets 34 and an auxiliary set of magnets 35, shown in Figs. 1, 8 and 9. A shaft 36 is mounted to rock in the upper rear portion of the frame of the machine, and this shaft carries a downwardly extending crank arm 37 at or near its left-hand end, a similar arm 37ª at or near its right-hand end, and an intermediate crank arm 37ᵇ. A pivot pin 38 is passed through the lower end of the left-hand crank arm 37, as shown in Fig. 8, and this pivot pin 38 is likewise passed through a crank arm 38ª from the armature 40 of the main magnet, the other end of the said armature being pivoted to the intermediate crank arm 37ᵇ on said shaft 36 as is shown in Fig. 1. The crank arm 38ª of the armature is rigidly secured to the shank 39 of a segment D by a pin 41 or a like device. Thus when the magnets 34 are energized and the armature 40 attracted, the free end of the shank 39 of the segment D will be raised as far as the projected bolt 22 operated by a key lever will admit, as these bolts are intended to regulate the upward throw of the segment. See Fig. 8. The segment is provided with a vertical head 42, toothed upon its forward or outer edge, and the teeth of the segment are adapted to engage with the teeth of a pinion 43 on a shaft 44 and located in the space between the left-hand side of the frame and the parallel partition 31, as shown in Figs. 1 and 8. A drive wheel B is mounted to slide on the shaft 44 and to turn with said shaft, see Fig. 1, but while the drive wheel moves upon its shaft relatively to the movement of the carriage of the type writer to which the attachment is made, it is not brought into action relative to an index wheel until one of the key levers has been pressed and the magnets 34 energized in a manner which will be hereinafter set forth.

The drive wheel B is acted upon by a carriage B', and this carriage is mounted to slide on a shaft 47, shown in Figs. 1, 4, 5, 10 and 11 and the said carriage is provided with a fork 46 which enters a circumferential groove 45, in the hub of the drive wheel B, as indicated in Figs. 5 and 10. The carriage B' is actuated by the movement of the carriage of the type writer to which the machine is applied, preferably in the following manner: A cord 48 made of metal or other material is secured to the left-hand end portion of the carriage B', and is conducted to the left-hand side of the attachment, and is passed around and secured to a spring drum 49, mounted to turn in brackets 50 at the left-hand side of the attachment, as shown in Fig. 1, while a similar cord 51 is attached to the right-hand end of the carriage B' and is connected at the other end with one step of a differential pulley 52 mounted to turn in brackets 53ª, and a second cord 51ª, connected with the other step of the pulley is carried to an engagement with the carriage of the type-writing machine and over any necessary guide pulleys. Thus it will be observed that the carriage of the attachment travels with the carriage of the type-writing machine. A spring 54 is projected from the left-hand side of the frame, or from a nearby support, over the shank 39 of the segment D employed to actuate the drive wheel B. This spring 54 is used to assist the segment in returning to its normal position.

A bar 55, which we denominate a universal bar, is depressed each time that a key lever is forced downward at its rear end. In fact the bar 55 extends beneath and in the downward path of each of the key levers, as shown in Fig. 1. This universal bar 55 is connected by arms 56 with a rock shaft 57, and said shaft may be denominated a universal rock shaft. The universal bar through the medium of this rock shaft 57 and connections, controls or regulates the movement of the major portion of the operative mechanism of the attachment. This universal rock shaft 57 is provided at its right-hand end with a crank arm 58, and this arm is usually connected by a spring 59 with the segment shaft 36, or shaft that brings the segment in position for engagement with the pinion 43 on the drive shaft 44. The spring 59 serves to return the universal bar 55 to its upper or normal position after a key lever has been removed from the influence of a numeral key of a typewriter. The crank arm 58 of the universal rock shaft 57 is provided at its lower end with a pin 60, as shown in Fig. 9. The mechanism controlled by this crank arm 58 is shown in Figs. 4, 5, 6 and 9, and is as follows: A link 61 is pivoted to the right-hand crank arm 37ª on the segment rock shaft 36, shown in Fig. 9, and this link 61, as shown in Fig. 4, has a bell crank connection 62 with an alining shaft 63, which shaft controls the mechanism for alining the index wheels C. This alining is accomplished through the medium of a bar 64, whose lower edge is usually made V-shaped, and this bar is adapted to enter longitudinally alining spaces between the teeth of the aforesaid index wheels C, as illustrated in Figs. 1 and 4. This alining bar 64 is located across the upper central portion of the index wheels, and is connected with the alining rock shaft 63 by means of arms 65 or their equivalents, and a mechanism E adapted to serve as a check to prevent too great a throw of the index wheels, is controlled from the carrying frame of the alining bar. This check mechanism E is in its turn attached to the carriage B' as shown in Figs. 4, 5 and 6.

The controlling device for the check mechanism E consists of a bar 66, pivoted in the arms 65 parallel with the alining bar 64 and alining shaft 63, and the said bar is provided with a longitudinal apron 67, which normally extends downwardly and rearwardly therefrom throughout practically the full length of the bar 66, as illustrated in Fig. 1, and this apron is held in the aforesaid rearward and downward inclination through the medium of a spring 68, having one end attached to the bar 66 and the other end in engagement with one of the arms 65, as shown in Figs. 1 and 4.

The controlling device for the check mechanism E is brought into action when the frame carrying the alining bar is raised, by forming a crank arm 69 at the right hand end of the apron carrying bar 66, which as the frame of the alining bar 64 is raised engages with a pin 70 at the right-hand side of the frame, causing the apron 67 to be depressed at that time. The downward movement of the crank arm 69 is limited by contact with a lower pin 71, also attached to the frame, as shown in Figs. 1 and 2.

When the universal bar 55 is depressed by any one of the key levers A, motion is communicated to the segment rock shaft 36 and consequently to the segment D, by imparting to the link 61 a forward throw, and this is accomplished by causing the pin 60 on the arm 58 of the universal rock shaft 57 to operate in a depression 61$^b$ in the upper edge of an angle lever 61$^a$, which angle lever is fulcrumed by a suitable pivot pin 61$^c$ to the inner face of the right-hand side of the frame of the attachment, as shown in Fig. 9; and the forward end of this lever 61$^a$ is connected by a short link 61$^d$ to the main link 61; and the downward movement of the main link 61 is limited by being brought in engagement with an eccentric stop 61$^e$, pivoted to the side of the frame below the said link 61, as shown in Figs. 8 and 9. When a numeral key, for example the key indicating the numeral "1" on the typewriter, is depressed, the first half of the movement of the key lever A depressed by said key, causes a bolt 22 to be thrown outward and limit the upward movement of the electrically controlled segment D, raising the alining bar 64 and bringing the head 42 of the segment in mesh with the pinion 43, so that when the segment is raised by the movement of the armature 40 toward the magnet 34, the segment will immediately revolve the pinion 43 and consequently the drive shaft 44 and the drive wheel B. The initial movement of the segment is accomplished by the movement of the segment shaft 36, as has been stated, and which is rocked by the depression of the universal bar 55 and consequent movement of the universal rock shaft 57, its arm 58 and the connection between said arm and the link 61, as is shown in Fig. 9, which latter movement likewise serves to impart motion to the alining bar, as shown in Fig. 4. The last half of the movement of the key lever provides time for the armature 40 to work.

The electrical devices employed, as heretofore stated, consist of main magnets 34 and their armature and auxiliary magnets 35 and accompanying armature. The magnets 34 may be regarded as a single magnet and the same is true of the magnets 35. Two binding posts 72 and 73 are located at the left-hand side of the frame, being wired in suitable manner to a battery or other medium for generating electricity. The wiring as shown (see Fig. 13) consists of a wire 74, carried from the binding post 72 and wound around the universal shaft 57. This wire 74 is the main wire, and is carried to a connection with a contact 75, which contact is in the nature of a spring and has a return section at one side having a point 76 formed thereon, and the contact 75 is secured upon an insulating block 77, in turn secured to an arm 56 of the universal bar 55, as illustrated in Figs. 1 and 13. The contact 75 is therefore a movable contact, and is adapted to be brought in engagement with another contact 78, which is in the form of a spring, as is shown especially in Fig. 13, and this spring is attached to an insulating block 79, secured to the bottom portion of the bar 11 which receives in the groove 12 the bar 13 upon which the key levers A are fulcrumed. A second contact point 80 is likewise attached to the insulating block 79, and as the universal shaft and its bar 55 are depressed by a figure key A' of the typewriting machine, the contact 80 engages with the point 76 of the movable contact 75, once at the downward stroke of a key lever and again at the upward stroke of the key lever. When such a contact is made, the auxiliary magnets 35 are energized and an auxiliary alining bar is brought into action, as will be hereinafter described. The connections which occur between the contacts 75 and 78, serve to energize the main magnets 34, and thus actuate the segment D and the shaft 44 on which the drive wheel B is mounted to turn and slide.

A wire 81 is carried from the contact 78 to the magnets 34 and through the magnets, from which the current is conducted to the binding post 73 through another wire 82, shown in Fig. 1. A wire 83, leading from the contact 80, is carried to the auxiliary magnets 35, and the current passes through these magnets and along a wire 84, which is connected with the wire 82, and consequently to the binding post 73. But we desire it to be understood that the wiring may be differently accomplished, and that if desired instead of the drive wheel being electrically operated, it may be manually controlled.

An auxiliary alining bar 85 is located at the front of the machine, and is adapted to correct the alinement of the index wheels C in the event they should become disarranged before the main alining bar 64 descends. This auxiliary alining bar 85 is given a taper at its contact face, greater on one side than the other, so that in the event the spaces between the teeth of the index wheels are not in alinement, the said engaging point may readily enter the said spaces and true them. This auxiliary alining bar is secured upon a shaft 86, mounted to rock in the frame of the attachment at the front, the bar being secured to the shaft 86 through the medium of arms 87, as shown in Figs. 1, 2, 5 and 6. A spring 88 normally holds the said auxiliary alining bar out of engagement with the index wheels, as is also shown in Figs. 1 and 2, and this auxiliary alining bar is not brought into action until the contact points 75 and 80 engage and thus energize the auxiliary magnets 35. The auxiliary alining bar is moved by providing a crank arm 89 at the right-hand end of the shaft 86, and pivoting one end of a connecting bar 90 to the said crank arm, which connecting bar 90 is carried rearward and is pivoted to a crank arm 91, projected downward from the armature 92 of the auxiliary magnets 35, as illustrated in Fig. 9, the said armature being pivoted in suitable brackets 93 projected downward from the yoke 33.

The adding head F of the machine consists of a series of adding wheels C, made from any suitable material and in any desired number. Each index wheel is provided with ten teeth, and upon each tooth a numeral is produced, the numerals reading from "0" to "9" inclusive, and the teeth of the drive wheel B are arranged to enter the spaces between the teeth on the index wheels. Each index wheel moves independently, and each index wheel is provided upon one of its side faces with an annular flange 94, and a tooth 95 is projected from this flange, having its sides recessed where a tooth connects with the flange, as shown in Fig. 4, and the flange 94 is likewise provided with a recess 96 at its outer peripheral portion at each side of the tooth 95, as is illustrated also in Figs. 4 to 6. The index wheels are mounted to turn freely on a shaft 97, the ends whereof may turn in the frame of the attachment, and the said shaft is provided at its right-hand end with a knob 97ª. Each index wheel turns upon a sleeve 98, the sleeves being loosely mounted on the shaft 97, and furthermore, the index wheels are properly spaced by washers 99 which are likewise loosely mounted on the shaft 97. A stationary shaft 100 is located below and slightly in advance of the drive shaft 44, as is also shown in Figs. 4 to 6, and a series of bell crank levers 101 is loosely mounted on the shaft 100. One member of these bell crank levers is longer than the other, and the longer member extends upwardly and beneath the series of index wheels, being provided at its forward end with a suitable stud 102, while the shorter member 103 of each bell crank lever is in the nature of a finger, and extends downward and rearward, its rear end being flat or straight.

A carrying wheel C' is mounted upon the stud 102 of each bell crank lever 101, and a carrying wheel C' is located immediately below each of the index wheels C. Each carrying wheel is provided with teeth 104 at its periphery in the same vertical plane with the wheels, and the outer ends of these teeth are concaved so that they may be brought in frictional engagement with the outer peripheries of the flanges 94 secured to the index wheels; and in the normal position of the carrying wheels such a contact occurs. The index wheels are prevented from turning to carry over except at that time, when said teeth 104 again enter the recesses 96 in the index wheels, thus permitting the teeth 95 projected from the index wheels to turn the carrying wheels with which said teeth 95 engage, the distance of one tooth, and thus communicate motion to the next index wheel to indicate a sum greater than 9. This communication between two adjoining index wheels is brought about by producing lateral teeth 105 at one side of each carrying wheel at or about the central portion of said binding teeth 104 by punching out the metal and bending the punched portions, or otherwise, which teeth 105 act as the teeth of a cog and enter the spaces between the teeth of the adjoining index wheel. The contact between the teeth 104 and the flange 94 of an index wheel is very slight and at times they do not touch. The index wheels are in fact prevented from turning by engagement with the lateral or cog teeth 105 of the carrying wheels, which latter wheels are prevented from turning by one of the curved teeth 104 engaging the flange of the next index wheel to the right. The straight teeth 104 act in pairs in conjunction with the flange 94 of the index-wheel of lower order and each pair of teeth have the ends made concave alike but in an opposite direction so as to constitute a surface of sufficient length to cause such carrying-wheel to be held from rotation when it is up. It will thus be seen that each pair of the concave teeth are virtually one tooth, the space between them being in the present instance the result of displacing the metal laterally in order to provide the bent carrying tooth 105. The carrying-wheel is turned the distance of one tooth, or rather one pair of teeth 104, at each complete revolution of the index wheel of lower order whose flange it engages and at the time when such wheel is passing from 9 to 0, by virtue of the tooth 95 on the flange 94 engaging with the space between a pair of the straight teeth 104 on the carrying-wheel.

This construction is substantially what is known as the Geneva movement, it being a modification of the well-known Geneva stop for watches. When the parts are in normal positions with the tens carrying-wheels C' all up, an index-wheel C of lower order has the concave ends of a pair of straight teeth 104 of a carrying-wheel lying sufficiently close to the flange 94 of the index wheel to lock the carrying-wheel and at this time the lateral carrying-teeth 105 lie in the path of the teeth on the periphery of the index-wheel of next higher order. Considering the relation between the straight teeth 104 and the flange 94 of a low order index-wheel, the relative shape of the parts is such that while the index-wheel may be turned on its axis, the carrying-wheel cannot be turned, as will be readily understood more particularly from Figs. 4, 5, 15 and 16. This carrying-wheel is thus locked by its straight teeth lying close to the flange 94 of the index-wheel of lower order, and the index-wheel of higher order is locked by reason of a lateral tooth 105 of such carrying-wheel taking in between the teeth of said index-wheel of higher order. In order therefore to actuate a certain index-wheel by the drive-wheel B, the tens-carrying-wheel must be dropped or lowered so that its lateral tooth 105 is out of engagement and out of the path of the peripheral teeth of the said index-wheel which may then be freely turned, as its flange 94 is then only in sliding engagement with a pair of straight teeth 104 on the adjacent carrying-wheel which does not prevent the turning of such index-wheel. This dropping of the carrying-wheel which by a lateral tooth 105, locks a certain index-wheel which it is desired to operate is more clearly illustrated in Fig. 16, in which it may be supposed that the right hand index-wheel C is to be actuated by the drive-wheel B, when moved into engagement with it for the purpose. This index-wheel is free to turn because its peripheral teeth are free from a carrying-tooth 105 of the dropped carrying-wheel C'. Assuming now that the operation of the right hand index-wheel C in Fig. 16 is such as necessitates carrying over the tens to the index-wheel of next higher order at its left-hand side. This operation is effected by the single tooth 95 projecting from the flange 94 of the index-wheel of lower order which is being actuated, entering between two pairs of the straight teeth 104 of the carrying-wheel C' which is next to the dropped one, and giving such next carrying-wheel a turn and this serves to turn the index-wheel of next higher order one tooth, through means of the carrying-tooth 105 of such carrying-wheel engaging the peripheral teeth of the index-wheel to which the carrying is done.

The check mechanism E is illustrated in detail in Figs. 4, 5, 6, 10 and 11, and consists of a crank or L-shaped arm 106, the vertical member 106$^a$ whereof is pivoted in a yoke 107 attached to the carriage, and the upper member 106$^b$ faces the index or adding wheels and has an upper projection 113 and a lower projection 113$^a$. A spring 108 is coiled around the pivot pin of the arm 106, having bearing against the yoke and against the rear edge of the vertical or body member 106$^a$ of said arm 106, and said spring serves to hold the arm 106 in the inclined position shown in Figs. 4, 5, 6 and 10, and likewise assists in returning the arm to its normal position when operated upon by the apron 67 of the depressing device carried by the upper alining bar frame. The vertical member of the said arm 106 is provided with a stop 109, and the downwardly extending section 113$^a$ of the upper member is provided with a stop 110 and these two stops 109 and 110 serve to limit the movement of the arm 106. A check finger 111 is pivoted on the arm 106 where its two members connect, and said finger 111 extends beyond the forward edge of the arm 106 and is normally held in an upward position, shown in Figs. 4 to 6 and Fig. 10, by a spring 112, but the upward movement of the said check finger is limited by a stop pin 114, located upon the upper extension 113 of the arm 106, while the downward movement of said finger 111 is limited by engagement with the stop 110.

The carrying wheels C' are held in their upper position, or in engagement with the index wheels C, or are dropped out of engagement with said index wheels by means of the cams 115, one of said cams being provided for each bell crank lever 101 supporting a carrying wheel C'. It is necessary that a carrying wheel shall be dropped before the index wheel C with which it mates can be operated, and at this point it may be stated that when the frame of the upper alining bar 64 is raised and the apron 67 carried by said frame is depressed in a forwardly direction, as has been described, the said apron will come in contact with the projecting portion 113 of the arm 106 of the check mechanism, as shown in Fig. 4, and will carry said arm forward and bring the finger 111 in the space between two teeth of the index wheel of next higher order to which the tens is to be carried and which is adjacent to the index-wheel then engaged by the drive-wheel B; and as the said index wheel is turned by the drive wheel B, through the medium of the carrying wheel C' actuated through the segment D, the finger 111 will be carried downward until it reaches the stop 110, thus permitting the index wheel of higher order to move the distance of one tooth only, and when the arm 106 is moved rearward from the index wheel owing to the upward movement of the key lever that brought the arm into action, the check mechanism will likewise move rearward, and the spring-controlled finger 111 will disengage from the index wheel and return to its normal position, ready to be again brought into action with reference to any other of the index wheels. In this way the check finger 111 prevents the wheel of next higher order from over-rotating, that is from being turned more than one tooth when the tens value is carried thereto by the carrying-wheel.

The cams 115 are provided with cam slots 116 in their upper edges, adapted to receive the fingers or shorter members 103 of the bell crank levers 101, and each cam 115 is also provided with a straight edge 117 above the recess 116 produced therein. The cams are loosely mounted upon a shaft 118, and this shaft is carried by a pivoted frame G to be hereinafter described. When the cams 115 are in their normal positions they incline downwardly and forwardly as shown in Fig. 4, and the shorter members 103 of the bell crank levers engage with the straight edges 117 of the said cams, thus holding the carrying wheels C' in their upper or normal position; but when a cam is rocked in an upward direction, the shorter member 103 of the bell crank lever which the cam controls, enters the slot 116 of the cam, and consequently the carrying wheel C' mounted on that particular bell crank lever may drop downward out of engagement with its mating index or adding wheel. The downward movement of the cams 115 is limited by projections 119 from their upper rear edges above the shaft 118, and when the cams are in their normal position these projections engage with the rear side of a setting rock shaft 120, whose functions will be hereinafter set forth. The cams are actuated by a nut 123 mounted to revolve between projections 124 at one end of the carriage B', as shown in Figs. 4 and 5 and in Figs. 6 and 11, and this nut is mounted to slide on the carriage shaft 47 and to turn with said shaft, while the carriage simply slides on the shaft. The nut 123 is provided with a peripheral recess 122, which is adapted to receive a pin 121 projected rearwardly from the pivot portion of the cam to be acted upon. The carriage shaft 47 is mounted to rock in the above-mentioned frame G, and the carriage shaft 47 is actuated when the universal bar 55 is depressed through the medium of a connecting rod 127, which is pivoted to an upwardly extending crank arm 126, located at one end of the carriage shaft 47, and the other end of the connecting bar 127 is pivoted to the lever 61ᵃ actuated by the pendent arm 58 of the universal shaft 57, as shown in Fig. 9. Thus it will be observed that each time the key lever is depressed the shaft 47 will be rocked in a manner to cause the cam 115 with which the nut 123 engages to be carried forward, permitting the carrying wheel located on the said cam to drop. The carriage B' is provided with inclined surfaces 124ᵃ at each end, in order that as the carriage slides upon its shaft 47 the said inclined surfaces 124ᵃ will carry the projections 119 of the cams 115 in engagement with the setting rock shaft 120 should any of the cams 115 be out of normal position.

The swinging frame G consists of two side arms or plates 128 which are pivoted on pins 129 to the respective sides 10 of the frame. In the lower horizontally extending part 130 of each side piece 128 is mounted the respective ends of the cam-shaft 118, which is fixed, and also the respective ends of the carriage-shaft 47, which rocks in its bearings. Thus the swinging frame G comprises the two side-plates 128, the cam-shaft 118 and the carriage shaft 47 and these two shafts are always maintained in the same fixed relation to each other, at the same time the two shafts are bodily moved laterally by the swinging of the frame, which is normally under spring tension by the action of the spring 136 bearing upon one of the said plates and this spring serves to force the frame rearwardly whenever the frame is free from the restraint of the cam-rollers 132 which are carried by the crank arms 133 fixed upon the setting rock shaft 120 and which cam-rollers ride over the rear edge of the respective side plates 128 of the frame G. The rear edge of each plate 128 is formed with a cam-recess 131 from which arises and runs forwardly and upwardly an inclined surface. Normally the cam-rollers 132 stand in recesses 131 and hold the frame G at its forward limit of movement and against the action of its spring 136. When the setting rock-shaft 120 is rocked so as to carry its crank arms 133 upwardly, the cam-rollers 132 thereof leaving the recesses 131 of the frame G move upwardly over the forwardly inclined part thereof thus freeing the frame so that its spring can force it backwardly and thereby carry backwardly both the cam-shaft 118 and the carriage-shaft 47. See more particularly Figs. 4, 5, 6, and 15. Thus while the bell-crank shaft 100 and the setting rock-shaft 120 remain in fixed position relatively to each other, the cam-shaft 118 varies its distance from each by reason of the swinging of the frame G of which it forms part. In the normal positions of these parts, the frame G is swung forwardly and held in such position by reason of the cam-rollers 132 on the arms 133 of the shaft 120 locking in the cam recesses 131 of the frame G, and under this condition the upward projections 119 on the cams 115 are each pressed against the rear side of the shaft 120, thereby raising each cam to what may be termed its intermediate position, as shown in Fig. 4, and in which the straight part 117 of each cam engages the end of the finger 103 of each bell crank lever 101 in such a manner as to hold up each carrying-wheel into engagement with the index-wheels. When a carrying-wheel C' is to be dropped in order to actuate the index-wheel C which is normally locked thereby, the carriage shaft 47 is rocked and this causes the notch 122 in the nut 123, to bear downwardly against the pin 121 on the rear of the cam 115 so as to raise the forward end of the cam to its highest position, thereby raising the straight edge 117 above the finger 103 of the engaging bell-crank lever 101 and permitting the same to drop into the notch 116, which movement lowers the forward end of the lever and drops the carrying-wheel thereof out of reach of the index-wheels, as will be particularly understood from Fig. 5. When it is desired to drop or disengage all of the carrying-wheels C' from the index-wheels C, for resetting to zero, this is done by rocking the setting-shaft 120, in a manner hereinafter described, so as to raise its crank arms 133 and carry the cam-rollers 132 upwardly to free the frame G and permit its spring to force it backwardly thereby moving the cam shaft 118 and all of cams 115 a sufficient distance backwardly and away from the fingers 103 of the bell-crank levers 101 to cause the outer ends of the latter to drop and thus lower all of the carrying-wheels, as shown in Fig. 6. From this position the parts are restored to their normal relations by the reverse movement of the setting rock-shaft 120, carrying downwardly and rearwardly its crank-arms 133 which move the cam-rollers 132 down the rear edge of the side plates 128 of frame G and press the same forwardly until the cam-rollers 132 enter the recesses 131 in said side plates, which movement restores the various parts to the positions shown in Fig. 4 and in this connection it will be noted that while in both Figs. 4 and 6 the straight part 117 is in engagement with the finger 103 of the bell-crank lever 101, nevertheless such part 117 is lower than and stands farther rearwardly, in Fig. 6 than in Fig. 4, because the cam shaft 118 has been swung downwardly and backwardly by the frame G and hence is a greater distance from the bell-crank lever shaft 100, in Fig. 6 than it is in Fig. 4.

A guide bar 135 is located below the carrying wheels C', and this guide bar is provided with recesses 134, into which the teeth of the carrying wheels C' enter, and are supported when said carrying wheels are in their lowered position, as illustrated in Fig. 5.

When it is desired to set one or more of the index wheels C, this is accomplished without manipulating the universal bar 55, since a lever 137 is secured to the left-hand end of the setting rock shaft 120, as shown in Fig. 7, and this lever is pressed upward by a spring 138 and bears normally against a stud 139, which is secured to a second lever 140, the latter lever being pivoted to the left-hand end of the frame. This lever 140 is provided with an outwardly and forwardly projected cam arm 141 and with a locking recess 142 at the inner end of the arm. The upper lever 140 is held in an upper or normal position by a spring 143 having a bearing against its lower end, and when the said lever 140 is in its normal position it rests at its upper end against a stop 144. By pressing down the lever 137 the rollers 132 on the crank arms 133 of the setting rock shaft 120 are carried out of the recesses 131 in the pivoted frame G, and the said frame is immediately pressed upward and rearward by a suitable spring 136 attached to the frame at one end and having bearing against the bottom forward portion of the frame G at its lower end, as is shown in Figs. 4, 5 and 6. This movement of the setting rock shaft will cause the frame G to swing so far rearward as to release the bell crank levers and permit the carrying wheels C' to drop to their lower position, as shown in Fig. 6, whereupon any one of the index wheels C may be turned by the finger or by a pencil.

When it is desired to reset all of the index wheels, namely, bring all of the zeros in line at the top, as shown in Fig. 1, this is accomplished in the following manner: A controlling shaft 150 is located in front of and slightly below the series of index wheels C, and this shaft is provided with crank arms 151 at its ends, pivoted to the sides of the frame, and the shaft 150 is further provided with rearwardly extending pins 152, capable of entering the spaces between the index wheels C and extending in direction of the flanges 94 of said wheels. The controlling shaft 150 extends at one end through a slot produced in the left-hand portion of the frame, as illustrated in Fig. 7, and the pins on the shaft 150 are normally held away from the index wheels by the projecting end of the said shaft being in engagement with the lower end of the cam arm 141 of the lever 140, as shown in Fig. 7. But when the pins 152 are to be carried into the spaces between the index wheels C, the lever 140 is pressed downward, thereby also pressing in the same direction the lever 137 connected with the setting rock shaft 120, and the projecting end of the pin shaft 150 will ride up the cam surface of the cam arm 141, and will enter the locking recess 142 in the lever 140, bringing the pins 152 to the desired position, as illustrated in Fig. 6, Thus it will be observed that at this time the carrying wheels C′ are all dropped, and that by turning the knob 97ª attached to the index wheel shaft 97, the index wheels will be turned by reason of their frictional contact with the shaft, until the single teeth 95 on the flanges 94 of the index wheels engage with the said pins, at which time the index wheels C will cease to turn, and when all of the teeth 95 have engaged with the pins 152 zero will appear on each index or adding wheel at the top and in front of the main alining bar, as shown in Fig. 1, since the tooth carrying zero is almost diametrically opposite to the single tooth 95 of an index wheel.

It is necessary when the index wheels are to be reset that the main alining bar 64 should be simultaneously raised from the wheels, and this is effected by locating a downwardly and forwardly extending crank arm 146, see Figs. 1 and 2, on the alining bar shaft 63, which crank arm 146 is engaged by a pin 145ª on a crank arm 145 attached to the setting rock shaft 120, as shown in Figs. 7 and 8.

It is very necessary that the drive wheel shaft shall not revolve until acted upon by the segment D. To that end a stop 147ª is connected with the crank arm 146, as shown in Fig. 8, and this stop has movement to and from the pinion 43. When the crank arm 146 is in its lower position, the stop 147ª locks the pinion 43, but when the crank arm 146 is raised, which happens when the main alining bar is elevated, the stop leaves the pinion and the pinion is free to move. A detent 148 is likewise provided for the pinion 43, the detent being controlled by a spring 149, and said detent prevents the pinion 43 from turning in the wrong direction.

In the general operation of the machine, let it be supposed a key lever A has been depressed by a key A′ of a type-writing machine. The key bolt 22 actuated by the said key lever A is moved into the path of the electrically operated segment D, and at the same time the main alining bar 64 is elevated and the carrying wheel C′ belonging to the index or adding wheel C which is to be turned, is lowered, and simultaneously the segment D is brought into mesh with the pinion on the drive wheel shaft 44, and the check mechanism E is turned toward the index wheel to be operated upon, a tooth on the drive wheel B and the check arm 111 of the said check mechanism E entering the spaces between the teeth of two adjacent index wheels C. All of these movements are accomplished during the first half of the movement of the key lever A. During the remaining half of the movement of the key lever A, the circuit in which the main magnet 34 is located is closed by the union of the two contacts 75 and 78, whereupon the segment D is raised by the armature of the said magnets, and the drive shaft is revolved, turning the drive wheel and consequently the index wheel the distance of one or more teeth according to which numeral key is depressed. As soon as the key lever A is relieved from pressure all the parts return to their normal positions. It will be remembered that the auxiliary alining bar 85 is normally out of engagement with the index wheels C, but during the first half of the movement of the key lever A, the circuit including the secondary or auxiliary magnets 35, is closed by reason of the contact 80 engaging with the moving contact 75, and the auxiliary alining bar is carried against the front surfaces of the index or adding wheels C, insuring their alinement. The circuit is then broken, and the auxiliary alining bar 85 is returned by its spring to its normal position. This operation is repeated as the key lever A is returned to its normal position, thereby insuring the alinement of the index wheels C, which will permit the main alining bar 64 to also drop into alining position.

We desire it to be understood that the levers termed key levers may also be termed impression levers, since they are operated to produce an impression.

Having thus described our invention, we claim as new, and desire to secure by Letters Patent,—

1. The combination with manually operated keys for printing the letters of an adding device and means for actuating it to effect an addition, a set of numeral keys for printing numeral characters and for controlling said adding device, electrically controlled mechanism brought into operation by the movement of said numeral keys for effecting the operation of the means for actuating the adding device, and electrically operated means brought into operation by the operation of said numeral keys for alining the numeral wheels of the adding device after they are set.

2. In an adding attachment for typewriting machines, the combination of an adding head, a single driving wheel therefor, mechanism for moving the driving wheel transversely of the head, electrically controlled devices for turning the wheel when in engagement with the head, impression levers controlling said electrical devices, means for regulating the rotation of the driving wheel and means for alining the parts of the adding head when they are once set.

3. In an adding attachment for type-writing or similar machines, an adding head, a universal rock shaft, an operating bar therefor, key levers attached to act upon the operating bar and adding head, an alining bar for the head, a driving wheel for the head having a sliding support, and a check device for the head carried by the said support, an actuating connection between the alining bar, the check device and the rock shaft, means for limiting the rotation of the driving wheel under the control of the key levers, an electrically controlled mechanism arranged to impart rotating motion to the driving wheel, and a second and independent electrically controlled mechanism adapted to operate an auxiliary alining bar for the head, as described.

4. An adding attachment for type-writing or similar machines, comprising a head constructed in divisions and mounted to rotate, a drive wheel having sliding and rotary motion, a tension device controlling the sliding movement of the wheel, an electrically controlled mechanism arranged to impart rotating motion to the wheel, checks controlling the throw of the drive wheel, and levers arranged to control the said mechanism and connect with the said checks.

5. In an adding attachment for type-writers or similar machines, an adding device, impression levers, an electrically controlled mechanism operated by the impression levers, means for actuating the adding device, and means for alining the numeral-carrying surfaces of the adding device, which means are under the control of the said electrically operated mechanism, as described.

6. In an attachment for type-writing or similar machines, an adding device, an electrically controlled actuating mechanism for the adding device, a universal shaft having extensions therefrom, provided with means for opening and closing an electric circuit, key levers controlling the movement of the said shaft, an alining bar and check for the adding device, and means for limiting the movement of the actuating mechanism for the adding device under the control of the key levers, as described.

7. In an adding attachment for type-writing or similar machines, an adding head having a plurality of alining bars arranged for engagement with said head at different points in the circumference of the said head, the said alining bars having independent movement and independent controlling mechanism.

8. In an adding attachment for type-writing or similar machines, an adding head, a plurality of alining bars arranged for longitudinal locking engagement with the said head at different points in its circumference and having independent movement, independent mechanism controlling the movement of the said alining bars, and key or impression levers arranged to control the controlling mechanism of the alining bars, as set forth.

9. In an adding attachment for type-writing or similar machines, an adding head, a main alining bar, and a parallel auxiliary alining bar for the said head, the said bars having independent movement, and independent mechanisms for controlling the two alining bars at different and predetermined periods, as set forth.

10. In an adding attachment for type-writing and similar machines, an adding head, an actuating device for the said head, comprising a shaft, a wheel mounted to slide and turn on said shaft, a pinion connected with said shaft, a segment controlling the movement of said pinion, means for limiting the working throw of the segment, the segment being capable of two independent movements a vertical and an end movement, and mechanism for actuating the segment to the performance of such movements.

11. In an adding attachment for type-writing or similar machines, an adding head consisting of a series of wheels having numeral-carrying teeth arranged at corresponding intervals, a main alining bar arranged to enter corresponding spaces between the upper teeth of the wheels comprised in the head, an auxiliary alining bar arranged to enter corresponding spaces between the teeth of the wheels of the head at a point below the upper surface of the head, and mechanisms adapted to independently operate the alining bars at different periods of time, so that when one is active the other will be inactive, as described.

12. The combination of a pair of adding wheels each provided with an annular part and a trip piece, a tens-carrying wheel provided with a series of peripheral teeth having concaved faces adapted in turn to engage the said annular part of the adding wheel of lower order, the said carrying wheel also being provided with laterally extending trip teeth projecting from the body of said wheel and adapted to engage the adding wheel of higher order and means for operating said adding wheels, substantially as and for the purpose set forth.

13. In an adding attachment for type-writing or similar machines, an adding head, an actuating device for the said head, comprising a shaft and a wheel mounted to slide and to turn upon the said shaft, a pinion connected with said shaft and a segment controlling the movement of said pinion, devices for regulating the movement of the segment, key levers controlling the movement of the said devices, and an electric mechanism for actuating the segment under the control of the key levers of the machine.

14. In an adding attachment for type-writing or similar machines, a series of key levers, an adding head and its operative mechanism under the control of the key levers, an auxiliary power also under the control of the key levers and adapted to act upon the adding head, which auxiliary power is independent of the main or controlling mechanism of the head and is capable of being brought into action at the option of the operator, and means, substantially as described, for controlling the movement of the said key levers.

15. In an adding attachment for typewriting and similar machines, an adding head, an operating mechanism for said head, an actuating device for the said operating mechanism, key levers controlling the said actuating device, and checks for the said operating mechanism, the said checks consisting of a series of bolts adapted to be projected in the path of a member of said operating mechanism, angle levers, supports for said levers, each lever being provided with a recess adapted to receive a pin from a bolt and a segmental surface adjacent to the recess, and a connection between the said angle levers and the key levers, for the purpose described.

16. In an adding attachment for typewriting and similar machines, the combination, with an adding head, of a carriage mounted to slide with said head, an alining bar for the head, a pivoted apron carried by the alining bar, its movement being controlled by the movement of the alining bar, and a check mechanism for said head and carried by said carriage, the said check mechanism consisting of an arm provided with a spring-controlled finger, which finger is arranged to enter the spaces between the teeth of the adding head, and means, substantially as described, for controlling the movement of said arm by means of said apron, as specified.

17. In an adding attachment for typewriting or similar machines, the combination, with an adding head, an alining bar for the said head, means for operating the said alining bar, and a spring-controlled apron carried by the support of the alining bar, the movement of the said apron being controlled by the movement of the alining bar, of a carriage mounted to slide parallel with the adding head, a drive wheel for the adding head mounted to slide and turn, a fork connection between said carriage and the drive wheel, an arm pivoted upon the carriage, having an extension adapted to be engaged by said apron, and a spring controlled finger pivotally mounted on said arm and adapted to enter the spaces between the teeth of the adding head, as and for the purpose set forth.

18. In an adding attachment for typewriting or similar machines, an adding head consisting of a series of adding wheels, a shaft upon which the adding wheels are loosely mounted, each adding wheel being provided with a series of peripheral teeth, each tooth bearing a numeral or a character upon its peripheral face and each of said adding wheels being further provided with an annular flange at one side and a tooth projected from said flange, carrying wheels engaging with the peripheral surfaces of the adding wheels, means for raising and lowering the carrying wheels to free or to bind the adding wheels, a zero-setting shaft movable to and from the adding wheels, projections carried by said shaft and adapted to engage with the teeth of the flanges on the adding wheels, an alining device for the adding wheels, and means for operating said device from the key levers of the machine.

19. In an adding attachment for typewriting or similar machines, an adding head consisting of a series of adding wheels, a shaft upon which the adding wheels are loosely mounted, each adding wheel being provided with peripheral teeth, each tooth having a numeral or a character produced upon its peripheral face, carrying wheels mounted upon movable supports, a flange secured to one face of each adding wheel, each flange being provided with a single tooth and with a recess at each side of the tooth, the carrying wheels being loosely mounted below the adding wheels, each carrying wheel having peripheral teeth provided with concaved outer surfaces arranged to engage with the periphery of the flange of an adding wheel, and with laterally and outwardly projecting teeth arranged to enter the spaces between the peripheral teeth of an adjacent adding wheel, means, substantially as shown and described for raising and lowering the said carrying wheels, a main and an auxiliary alining bar for the adding wheels, and mechanism for independently operating said alining bars, said mechanism being controlled by the key levers of the machine.

20. In an adding attachment for typewriting or similar machines, an adding head consisting of a series of adding wheels having peripheral teeth, and a series of carrying wheels for the adding wheels, the carrying wheels being independently mounted and capable of movement to and from the adding wheels at right angles to their axes, the arrangement being such that any one of the series of carrying wheels may be moved to and from its adding wheel independently of the other and a mechanism for accomplishing such movement.

21. In an adding attachment for typewriting or similar machines, the combination with an adding head consisting of a series of adding wheels having peripheral teeth each tooth bearing a numeral or a character upon its peripheral surface, said adding wheels having also side flanges each of said flanges being provided with a single tooth having recesses in the side edges of its shank, of a series of carrying wheels for the adding wheels each carrying wheel being provided with peripheral teeth in the same plane with the wheels, said peripheral teeth having concaved surfaces adapted to engage with the outer or peripheral surface of a flange on a corresponding adding wheel, each carrying wheel being also provided with laterally projected teeth opposite the peripheral teeth, and arranged to gear with the peripheral teeth of a corresponding adding wheel, an independent mounting for the carrying wheels of a series, the carrying wheels being capable of movement upon their mounts to and from the adding wheels at right angles to their axes, the movement being such that any one of the series of carrying wheels can be carried to and from its adding wheel independent of the other.

22. In an adding attachment for typewriting or similar machines, a series of adding wheels and a series of carrying wheels for the adding wheels, the carrying wheels being independently mounted and capable of movement to and from the adding wheels at right angles to their axes, the arrangement being such that any one of the series can be moved to and from its adding wheel independent of the other, and mechanism for accomplishing such movement, substantially as described.

23. In an adding attachment for typewriting or similar machines, a series of adding wheels, a series of carrying wheels for the adding wheels, the carrying wheels being independently mounted and having movement to and from the adding wheels at right angles to their axes, and a mechanism, substantially as described, for moving any number of the carrying wheels, or any individual carrying wheel to or from engagement with mating adding wheels.

24. An adding head, a driving wheel for the adding wheels of the head, a segment in operative connection with the driving wheel, and stops arranged to project in the path of the segment and limit its throw.

25. An adding head, a driving wheel for the adding wheels of the head, a segment arranged for driving connection with the driving wheels, key levers, and stops carried into or out of engagement with the segment by the action of the key levers when pressed and released.

26. An adding head, a driving shaft operatively connected with the adding wheels thereof, a pinion upon said shaft, a toothed member adapted to engage with the pinion, key levers, and a connection between the key levers and the toothed member, whereby said toothed member is moved into and out of engagement with the pinion, and means for moving the said toothed member in a direction transverse to the axis of the pinion to cause the latter to turn when in engagement therewith.

27. An adding head, a driving wheel for the head, a shaft upon which the driving wheel is mounted to turn, a pinion upon said shaft, a toothed member adapted to engage with the pinion, which member has end movement to and from the pinion, means for limiting the driving movement of the member, and an electric power brought into action by the key levers, said power being in operative connection with the toothed member to raise and release the same.

28. An adding head, a driving wheel for the adding wheels of the head, a shaft upon which the driving wheel is mounted to turn, a pinion mounted upon said shaft, a segment adapted to engage with the pinion, key levers, a connection between the key levers and segment, whereby the segment is moved to and from the pinion, an electric power brought into action by the key levers, which power is in operative connection with the segment to raise and release the same, and a series of stops having movement to and from the path of the segment, which stops are operated by the key levers.

29. An adding head, a driving wheel for the adding wheels of the head, a segment arranged for driving connection with the driving wheel, a mechanism for mechanically imparting movement to the segment, an electrically controlled mechanism arranged to impart driving movement to the segment, and key levers operating both the mechanical and electric mechanisms.

30. In an adding attachment for typewriting and similar machines, a series of key levers, a series of stops having sliding movement, and converting levers pivotally connecting the stops with the key levers.

31. In an adding attachment for typewriting and similar machines, a series of key levers, a series of stops capable of sliding movement, and converting levers of angular construction, having one member provided with an offset adapted to engage a pin upon the stop, the other member of the converting lever having pivotal connection with a key lever, the upper edges of the converting levers being convexed between their members, for the purpose specified.

32. In adding attachments for type-writing and similar machines, an adding head and a check adapted to prevent the overthrow of the adding wheels of said head, said check consisting of a carriage, an arm upon the carriage capable of movement to and from the head, and a pawl upon the said arm, provided with limiting stops and arranged to be moved in and out of engagement with an adding wheel for each carrying.

33. In an adding machine, an adding head, a pinion-carrying shaft operatively connected with the adding head and a controlling segment for driving said shaft, which segment has movement into and out of engagement with the pinion, and a movement at right angles to the longitudinal axis thereof to drive said pinion.

34. The combination of a series of figure keys, a series of adding wheels, a single toothed actuator common to all of the wheels but normally out of operative relation therewith, means for moving said actuator into operative relation with any one of said adding wheels, a single electromagnet for moving said actuator to turn any one of said wheels, an electric circuit including said electromagnet and adapted to be closed by any one of said figure keys, and means operated by said figure keys for controlling the extent of movement of the actuator when turning a wheel.

35. The combination of a series of figure keys, a series of adding wheels, a single toothed actuator common to all of said adding wheels, means for moving said actuator into operative relation with any adding wheel, an electromagnet for operating said actuator to turn any one of said wheels, and means operated by the figure keys for closing the circuit of said magnet and for regulating the movement of the actuator when turning an adding wheel.

36. The combination of a series of figure keys, a series of adding wheels, a toothed actuator normally out of operative relation with said wheels, means operating upon said actuator to move it into operative relation with any of said wheels, an electromagnet for moving said actuator to rotate any of said wheels, an electric circuit including said electromagnet, means operated by the figure keys for opening and closing said circuit, and devices operated by the figure keys for causing the actuator to move to a greater or less extent according to the value of the key operated.

37. The combination of a series of figure keys each operatively connected to a corresponding type, a carriage connected to the keys for spacing movement; a series of adding wheels provided with a rotating mechanism common to all the wheels, means controlled by the keys for coupling the wheels one at a time to said rotating mechanism, a single electromagnet, and circuit connections between the magnet and the figure keys whereby when said figure keys are operated to cause the types to record amounts said keys correspondingly close the circuit of said electromagnet and thereby cause the adding wheels to add the amounts recorded.

38. The combination of a series of figure keys, an adding wheel, a variable stroke electromagnet, means actuated by said magnet for turning said wheel, a series of stops mechanically connected with the figure keys and operated thereby for variably limiting the stroke imparted by said electromagnet, and a circuit controller for said electromagnet controlled by said keys.

39. The combination of a series of manually operated keys, a series of adding wheels, a single electromagnet operatively connected to actuate each of said wheels, means operated by the figure keys for opening and closing the circuit of said magnet, means mechanically operated by the keys for variably limiting the movement of the electromagnetic devices for actuating the wheels, and means operated automatically at the actuation of any key to cause said single electromagnet to operate any one of the adding wheels.

40. The combination with printing mechanism, of manually operated keys for actuating said printing mechanism, a series of adding wheels, electrically operated devices having a single electromagnet only controlled by said keys for rotating any of the wheels, and key-controlling mechanically operated devices for bringing the rotating devices into operative relation with any wheel and for variably limiting the rotation of the wheels.

JACOB C. WOLFE.
EDWIN W. MORTON.

Witnesses:
J. FRED ACKER,
F. W. HANAFORD.

---

Copies of this patent may be obtained for five cents each, by addressing the "Commissioner of Patents, Washington, D. C."